United States Patent
Rozman

(10) Patent No.: US 7,567,047 B2
(45) Date of Patent: Jul. 28, 2009

(54) ELECTRIC MOTOR CONTROL STRATEGIES FOR USING A LOW RESOLUTION POSITION SENSOR

(75) Inventor: Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 593 days.

(21) Appl. No.: 10/881,309

(22) Filed: Jun. 30, 2004

(65) Prior Publication Data

US 2006/0001393 A1    Jan. 5, 2006

(51) Int. Cl.
*H02P 1/04* (2006.01)

(52) U.S. Cl. .................. 318/400.17; 318/400.14; 318/432; 318/434; 323/271; 323/274; 323/284; 323/268; 180/412

(58) Field of Classification Search .................. 318/254, 318/138, 439, 799, 715, 721, 400.17, 400.14, 318/432, 434; 310/171; 324/207.2, 207.16; 323/271, 274, 284, 268

See application file for complete search history.

(56) References Cited

U.S. PATENT DOCUMENTS

| | | | |
|---|---|---|---|
| 3,654,479 A * | 4/1972 | Catherin ................ 250/231.16 |
| 3,678,352 A * | 7/1972 | Bedford ................. 318/400.41 |
| 3,931,555 A * | 1/1976 | Dohanich et al. .......... 318/271 |
| 4,355,273 A * | 10/1982 | DuVall ....................... 318/561 |
| 4,357,566 A * | 11/1982 | DuVall ....................... 318/636 |
| 4,461,988 A * | 7/1984 | Plunkett .................... 318/802 |
| 4,814,677 A * | 3/1989 | Plunkett ................ 318/400.02 |
| 4,884,016 A | 11/1989 | Aiello ........................ 318/685 |
| 4,949,021 A | 8/1990 | Rozman et al. |
| 5,029,263 A | 7/1991 | Rozman |
| 5,223,775 A * | 6/1993 | Mongeau ................... 318/432 |
| 5,406,155 A * | 4/1995 | Persson .................... 310/68 B |
| 5,793,834 A * | 8/1998 | Park ........................... 377/17 |
| 5,923,728 A * | 7/1999 | Ikkai et al. ................. 318/807 |
| 6,018,233 A | 1/2000 | Glennon |
| 6,037,752 A | 3/2000 | Glennon |
| 6,313,601 B1 * | 11/2001 | Kubo et al. ................. 318/799 |
| 6,329,782 B1 | 12/2001 | Chen et al. ................. 318/727 |
| 6,498,451 B1 * | 12/2002 | Boules et al. .............. 318/661 |
| 6,653,829 B1 * | 11/2003 | Henry et al. ........... 324/207.21 |

(Continued)

FOREIGN PATENT DOCUMENTS

EP    0 831 580 A2    3/1998

OTHER PUBLICATIONS

U.S. Appl. No. 10/893,462, filed Jul. 16, 2004.

(Continued)

*Primary Examiner*—Rita Leykin
(74) *Attorney, Agent, or Firm*—Carlson, Gaskey & Olds PC

(57) ABSTRACT

An electric motor control strategy includes using a low resolution position sensor that provides a square wave output signal. The position sensor information is converted into sinusoidal commutation signals for motor control that reduces torque ripple. In one disclosed example, square wave commutation is used at low motor speeds and a controller switches to sinusoidal commutation once a selected threshold speed of the motor is reached. In another disclosed example, sinusoidal commutation is used at all motor speeds with two different techniques for converting the square wave sensor signal into a sinusoidal commutation signal, depending on the motor speed.

26 Claims, 11 Drawing Sheets

U.S. PATENT DOCUMENTS

| | | | | |
|---|---|---|---|---|
| 6,822,417 | B2* | 11/2004 | Kawaji et al. | 318/701 |
| 6,826,499 | B2* | 11/2004 | Colosky et al. | 702/85 |
| 7,145,302 | B2* | 12/2006 | Sanglikar et al. | 318/400.18 |
| 2002/0097021 | A1* | 7/2002 | Yu | 318/800 |

OTHER PUBLICATIONS

U.S. Appl. No. 10/872,625, filed Jun. 21, 2004.
U.S. Appl. No. 10/806,635, filed Mar. 23, 2004.
European Search Report dated Oct. 6, 2005, relating to Application No. EP 05 25 3993.

* cited by examiner

US 7,567,047 B2

ELECTRIC MOTOR CONTROL STRATEGIES FOR USING A LOW RESOLUTION POSITION SENSOR

FIELD OF THE INVENTION

This invention generally relates to electric motor control. More particularly, this invention relates to utilizing low resolution position sensors in an electric motor control arrangement.

DESCRIPTION OF THE RELATED ART

Electric motors have a variety of uses. One is for electric start systems for starting engines, such as gas turbine engines. Different types of electric motors have been used for such purposes. In some instances, AC brushless motors are employed with sinusoidal back-EMF and current wave forms in electric engine start systems that require very smooth torque control. Such arrangements include a high number of poles to achieve higher power density (i.e., a higher ratio of torque per amp).

Typical arrangements include a high-resolution position sensor, such as a resolver, to detect electric motor shaft position. Motor commutation requires converting from a mechanical rotor position to an electrical position (i.e., electrical angle), which is often accomplished by multiplying the rotor position by a number of pole pairs.

One drawback associated with using such high-resolution position sensors is that they tend to be expensive. Additionally, resolvers, used for shaft position feedback contain several sources of error. These errors are compounded to by mechanical misalignment and runout, electrical excitation and signal processing. When multiplying by a high number of pole pairs, the electrical position feedback error is also proportionally increased. Such errors may cause torque ripple and speed modulation during motor operation, both of which are undesirable.

It is desirable to be able to use lower cost, low resolution position sensors for electric motor control. A significant difficulty encountered when taking this approach is that the low resolution position sensors typically provide square wave outputs. If a square wave current form is used for commutation, the torque ripple associated with the motor increases. Rectangular currents have associated torque ripple because the torque is the product of the motor back-EMF and the stator current. As smooth torque control is required, torque ripple should be avoided.

There is a need for a lower cost motor control system that is capable of working with low resolution position sensors. This invention provides techniques for processing low resolution position sensor signals in a manner that provides smooth torque control.

SUMMARY OF THE INVENTION

One example method of controlling an electric motor using low resolution position sensors, which is designed according to an embodiment of this invention, includes converting a square wave output signal from a low resolution position sensor into a sinusoidal motor commutation signal.

One example includes estimating the electrical position of the motor based upon an edge of the square wave output signal. Determining a frequency of the square wave output signal and integrating the determined frequency generates a signal that is indicative of the electrical position. A sinusoidal torque reference current wave form which is based upon the electrical position signal, can then be used for commutation.

One example method includes using square wave commutation at low motor speeds and then switching to sinusoidal commutation once a selected speed is achieved.

One example motor controller designed according to an embodiment of this invention includes a low resolution position sensor having a plurality of phases. The controller processes square wave output signals from the low resolution position sensor to generate a commutation signal. The processor converts the square wave output signals into a sinusoidal commutation signal. In one example, the processor includes a sensor signal processing module and a torque command module.

The various features and advantages of this invention will become apparent to those skilled in the art from the following detailed description of currently preferred embodiments. The drawings that accompany the detailed description can be briefly described as follows.

DETAILED DESCRIPTION OF THE PREFERRED EMBODIMENTS

Figure 1:
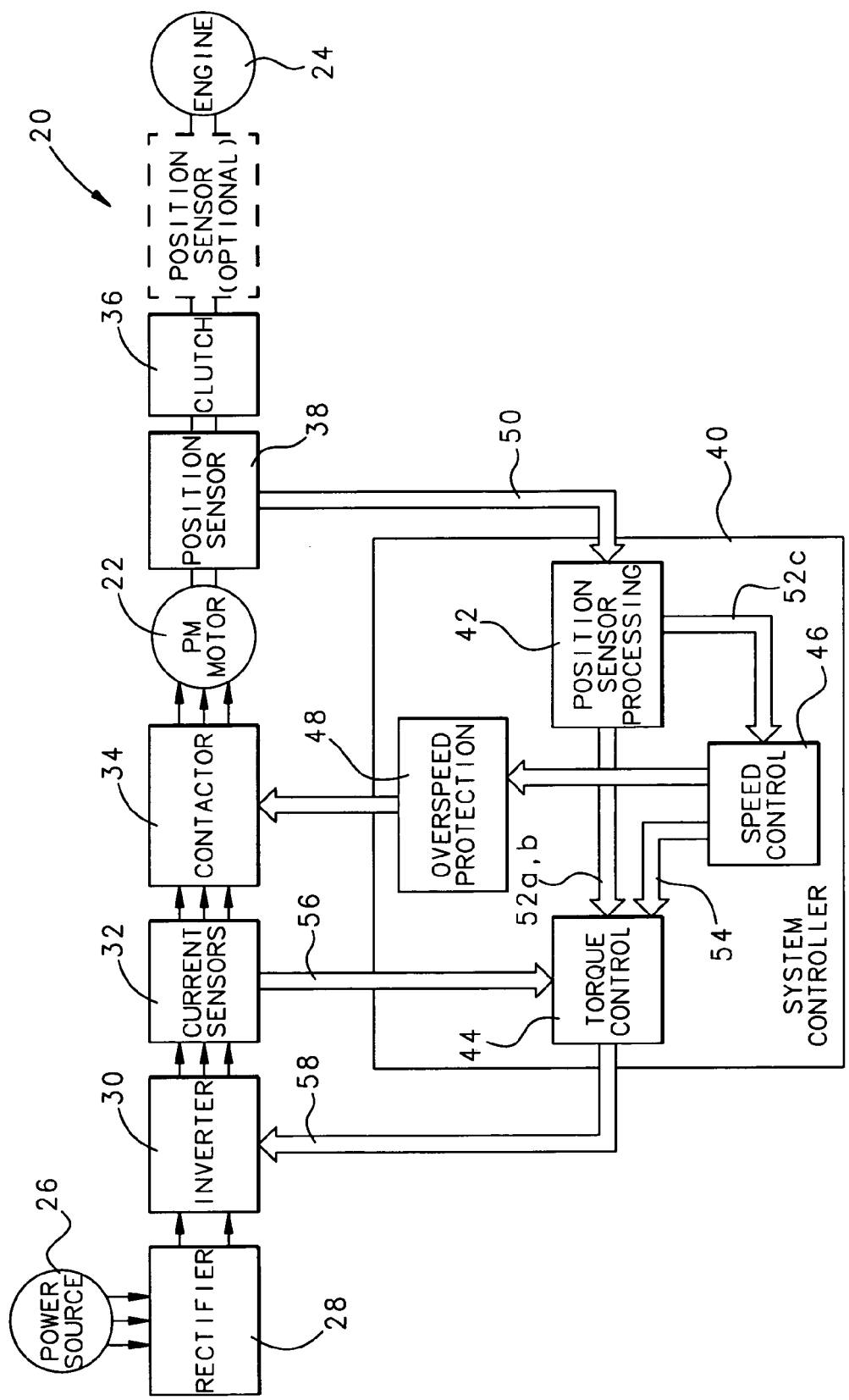
FIG. 1 schematically illustrates an electric start arrangement designed according to an embodiment of this invention.

FIG. 1 schematically illustrates an electric start system 20 having an electric motor 22 for starting an engine 24. In one example, the motor 22 is a permanent magnet motor and the engine 24 is a gas turbine engine. The motor 22 receives power from a power source or grid 26 through a rectifier 28 that is in series with an inverter 30, both of which may operate in a known manner. Current sensors 32 and a contactor 34 are provided between the inverter 30 and the motor 22 for control and inverter protection, respectively. The current sensors 32 and contactor 34 operate in a known manner.

A low resolution position sensor 38 provides motor position information to a controller 40 that controls operation of the motor 22. In one example, the position sensor 38 comprises at least one hall sensor and provides output signals with a plurality of phases that equals the number of phases of the motor 22. In one example, the number of hall sensors equals the number of phases of the motor 22. The controller 40 utilizes square wave output signals from the position sensor 38 for controlling the motor 22 and converts the square wave sensor signals into sinusoidal commutation signals so that sinusoidal motor excitation can be used with a low resolution position sensor.

In one of the example embodiments to be described below, the controller 40 switches between using square wave signal commutation (i.e., 120° commutation) at low motor speeds and sinusoidal signal commutation (i.e., 180° commutation) once the motor speed exceeds a selected threshold. Square wave commutation at low speeds takes into account the difficulties associated with obtaining position information from low resolution position sensors. In another example embodiment to be described below, the controller 40 converts the position sensor signals into sinusoidal signals for motor control even at low motor speeds.

Figure 2:
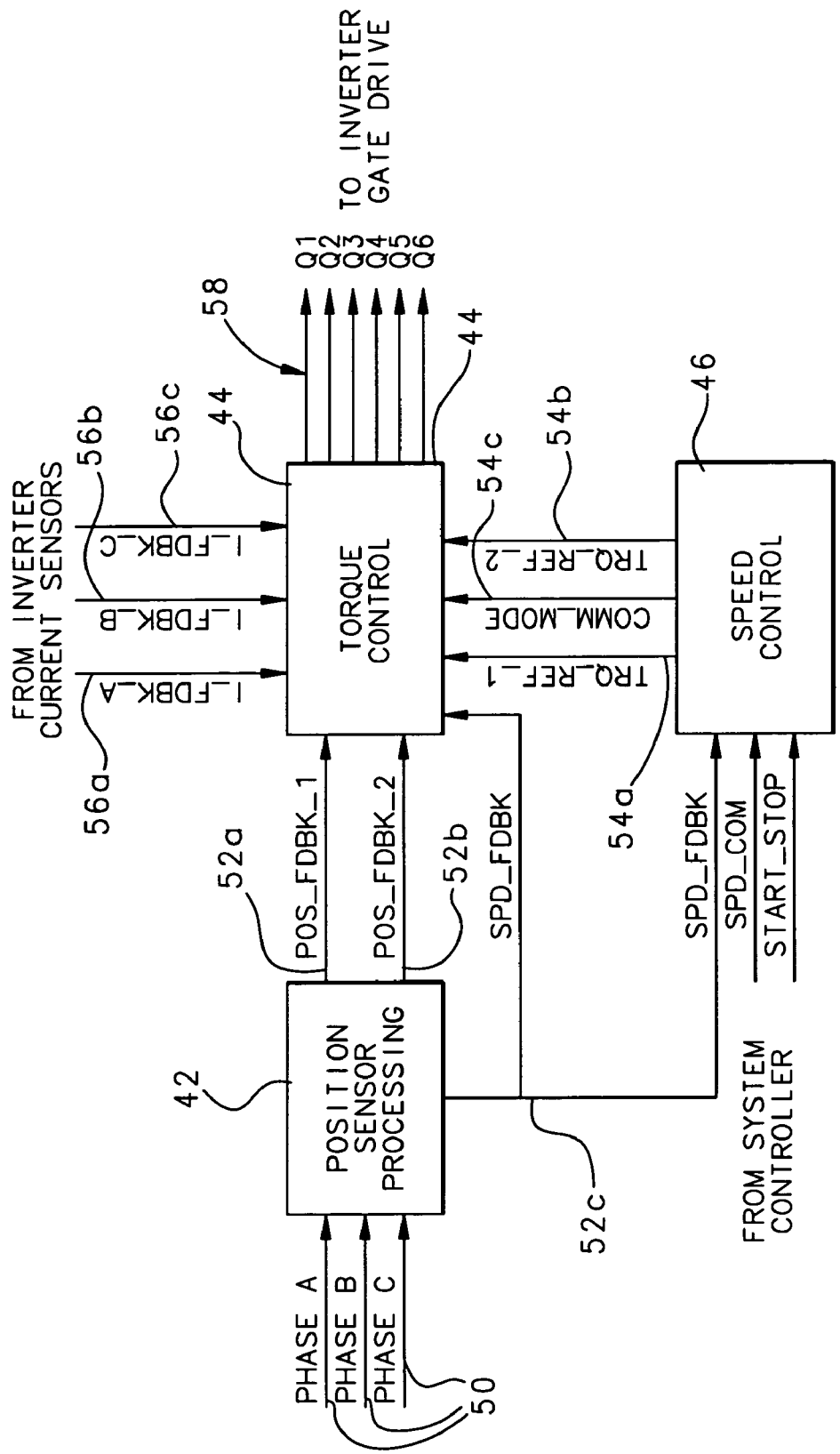
FIG. 2 schematically illustrates selected portions of the controller used in the embodiment of FIG. 1 for controlling an electric motor.

The illustrated controller 40 includes several modules schematically shown in FIGS. 1 and 2. A position sensor processing module 42 provides information to a torque control module 44 and a speed control module 46. The speed control module 46 provides information to the torque control module 44 and an over speed protection module 48 that controls the contactor 34 to protect against any over voltage that may damage the inverter 30 in case the clutch fails when the motor is generating power, for example.

The position sensor processing module 42 receives position information 50 from the position sensor 38. In one example, the module 42 provides speed feedback information 52c to the speed control module 46 and electrical angle information 52a, b to the torque control module 44. The speed control module 46 provides a torque reference 54 to the torque control module 44. The torque control module 44 also receives current information 56 from the current sensors 32. The torque control module 44 generates an output 58 that drives the gates of the inverter 30 for powering the motor 22 according to the needs of a particular situation.

Referring to FIG. 2, several of the modules of the controller 40 are shown. In this example, the motor 22 is a three-phase motor and the sensor arrangement 38 provides three-phase output signals 50 to the position sensor processing module 42. In this example, the sensor processing module 42 provides a first output at 52A that is a position feedback signal used for square wave (i.e., 120°) commutation. A second position feedback signal at 52B is provided to the torque control module 44 when the motor speed has exceeded a selected threshold for sinusoidal (i.e., 180°) commutation. The sensor processing module 42 also provides a speed feedback signal 52C to the torque control module 44 and the speed control module 46.

In this example, the speed control module 46 provides three different outputs to the torque control module 44. A first torque reference signal 54A is used by the torque control module during square wave commutation. A second torque reference signal 54B is used by the torque control module 44 during sinusoidal commutation. A commutation mode signal 54C provides an indication of when to switch between square wave commutation and sinusoidal commutation. The motor speed threshold at which the switch is made can be selected depending upon the needs of a particular situation. Those skilled in the art who have the benefit of this description will be able to select an appropriate threshold.

The torque control module 44 also receives three phase current feedback information 56A, 56B and 56C from the current sensors 32.

Figure 3:
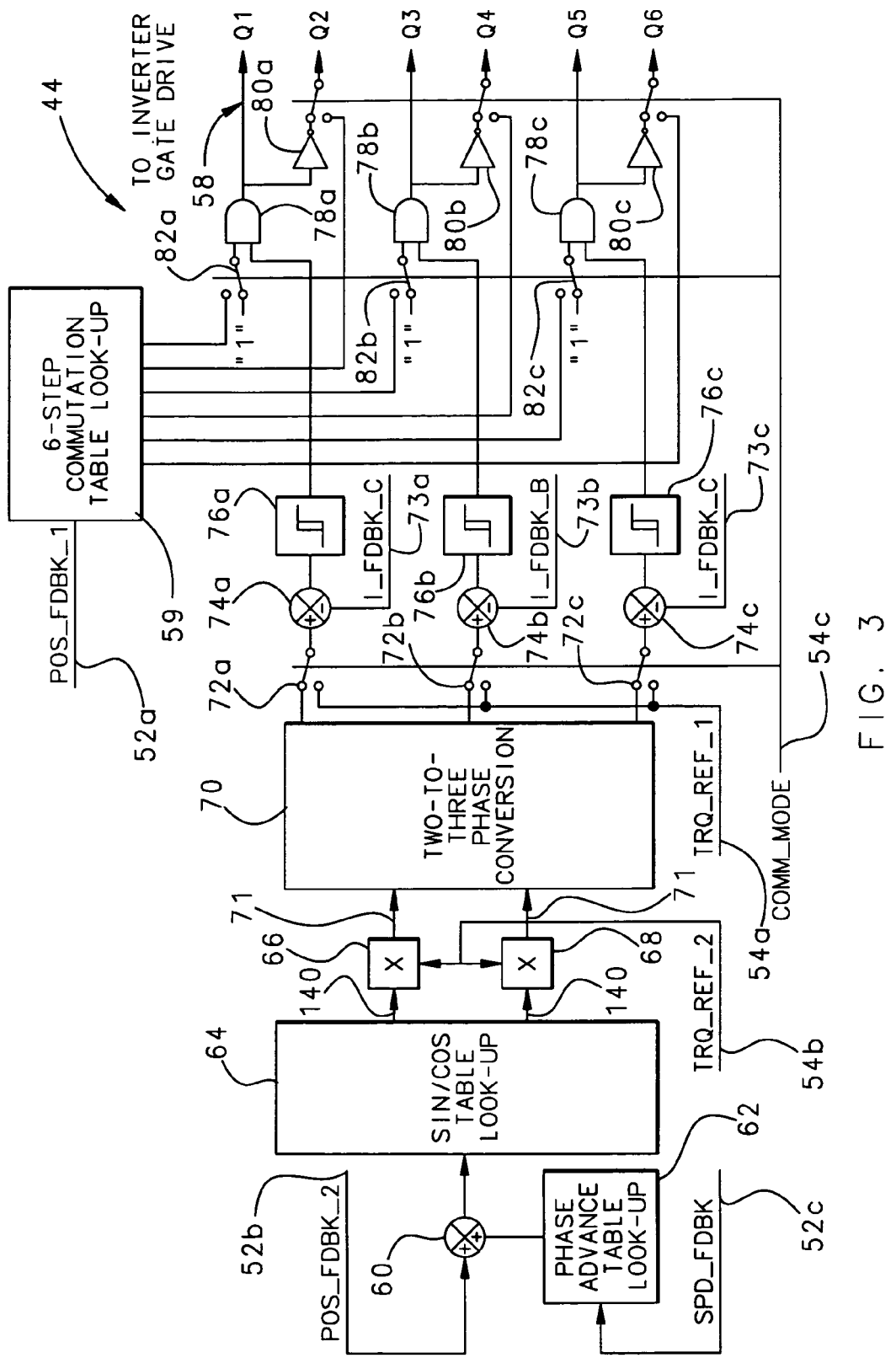
FIG. 3 schematically illustrates an example torque control module from the embodiment of FIG. 2.

One example implementation of the torque control module 44 is schematically shown in FIG. 3. At low motor speeds, square wave commutation is used to provide motor control signals 58. The position feedback signal 52A from the speed processing module 42 is provided to a six-step commutation look-up table 59. The output of the commutation look-up table results in the signals 58 provided to the inverter gates, which in this example includes six gates. In one example, the position feedback signal 52A is a three-bit word based upon the three phase input 50 from the low resolution position sensor 38 (i.e., three hall sensors). Square wave commutation can be used at low motor speeds at the beginning of a starting procedure for the engine 24, for example.

When sinusoidal commutation is used, a summer 60 receives the position feedback signal 52B from the sensor processing module 42. In this example, a phase advance look-up table 62 responds to the speed feedback signal 52C to add a phase advance when necessary to reduce the field produced by rotating magnets of the motor 22 at high speeds, for example. The output of the summer 60 is processed by a sin/cos look-up table 64. A sin output from the look-up table 64 is multiplied in a multiplier 66 with the torque reference signal 54B from the speed control module 46. A cos signal from the look-up table 64 is multiplied by a multiplier 68 with the same torque reference signal 54B. The output of the multipliers 66 and 68 is a sinusoidal wave form commutation signal used for timing the current supply to the motor to control the phase relationship between the supplied current and the field present in the motor according to known motor control principles.

A two-to-three phase converter 70 converts the signal 71 into three signals. Switches 72A, 72B and 72C are controlled responsive to the commutation mode signal 54C provided by the speed control module 46. During sinusoidal commutation, the switches 72 conduct the output signals from the converter 70 to summers 74A, 74B and 74C. During square wave commutation (i.e., at very low motor speeds), the switches 72 are switched responsive to the signal 54c such that the torque reference signal 54A is provided to the summers 74 instead of the signals from the converter 70.

A current feedback signal 73a, b, c is combined with the signals from the converter 70 during sinusoidal communication or the torque reference signal 54a during square wave commutation.

The output of the summers 74A, 74B and 74C, which are error signals indicating a difference between the command signals from the converter 70 and the current feedback signals 73a, b, c, are provided to voltage comparators with a hysteresis 76A, 76B and 76C, respectively. The output of those regulators are ANDed at 78A, 78B and 78C, respectively. The output inverter gate drive signals Q1, Q3 and Q5 come directly from the AND gates 78. The signals Q2, Q4 and Q6 are inverted by inverters 80A, 80B and 80C. Switches associated with the AND gates 78 and the inverter 80 are also controlled by the commutation mode signal 54C from the speed control module 46.

The commutation mode signal 54c also controls switches 82a, b, c to provide the output of the look up table 59 to the AND gates 78 during square wave commutation. During sinusoidal commutation, the switches 82 are connected to a logic "1" signal so that the output from the voltage comparators 76 control the output from the AND gates 78 and ultimately the signals 58.

Figure 4:
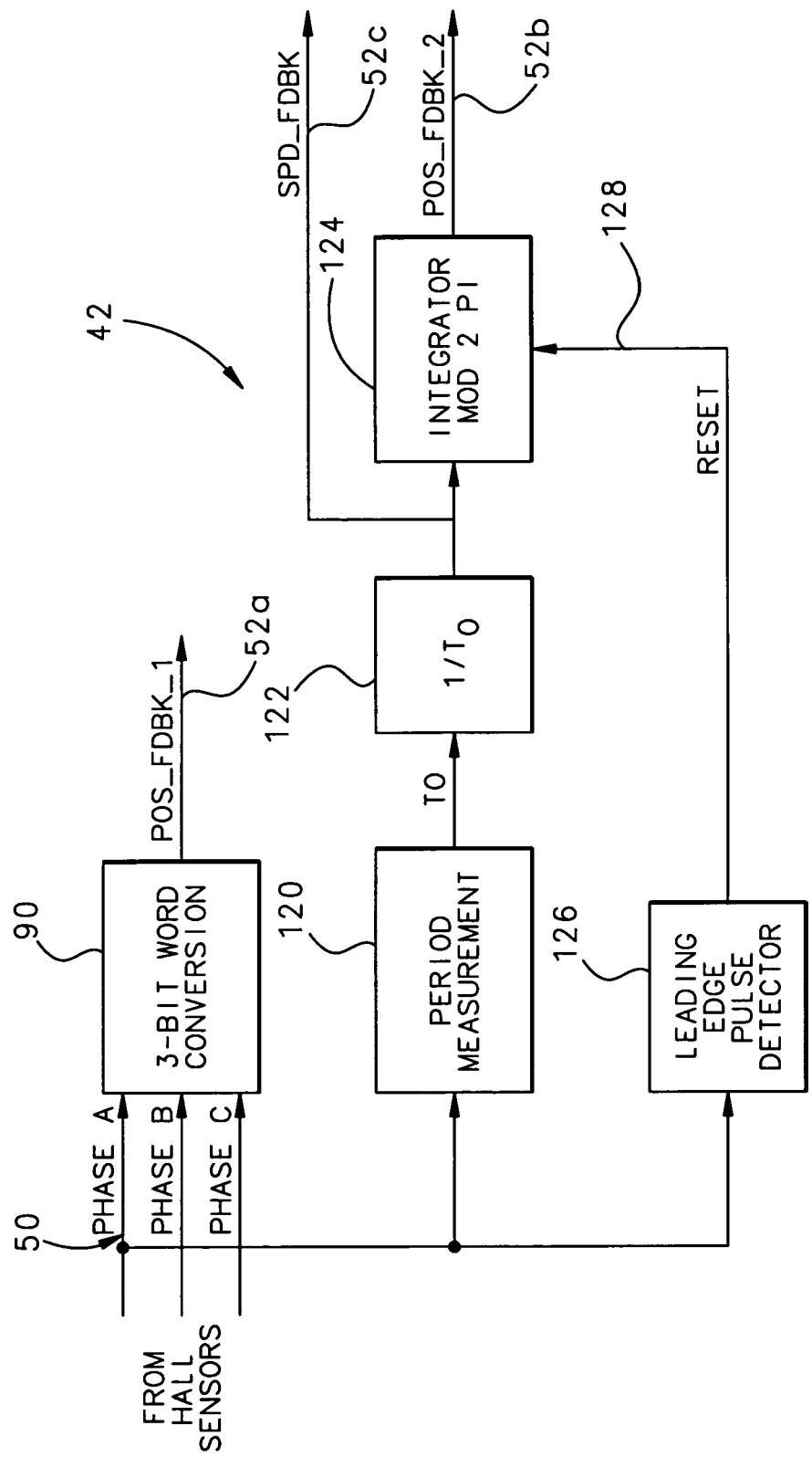
FIG. 4 schematically illustrates the example low resolution position sensor processing module from the embodiment of FIG. 2.

The position feedback signals 52A and 52B are provided in one example by a position sensor processing module 42 as schematically shown in FIG. 4. At low motor speeds when square wave commutation is used, the three phase inputs 50, which are square wave output signals from the low resolution position sensor 38 are converted into a three bit word by a conversion module 90 to provide the position feedback signal 52A. There are various ways to provide a three bit word that can be used as the inverter gate drive outputs 58 for square wave commutation using a six-step commutation look-up table 59 as shown in FIG. 3, for example.

Figure 5A:
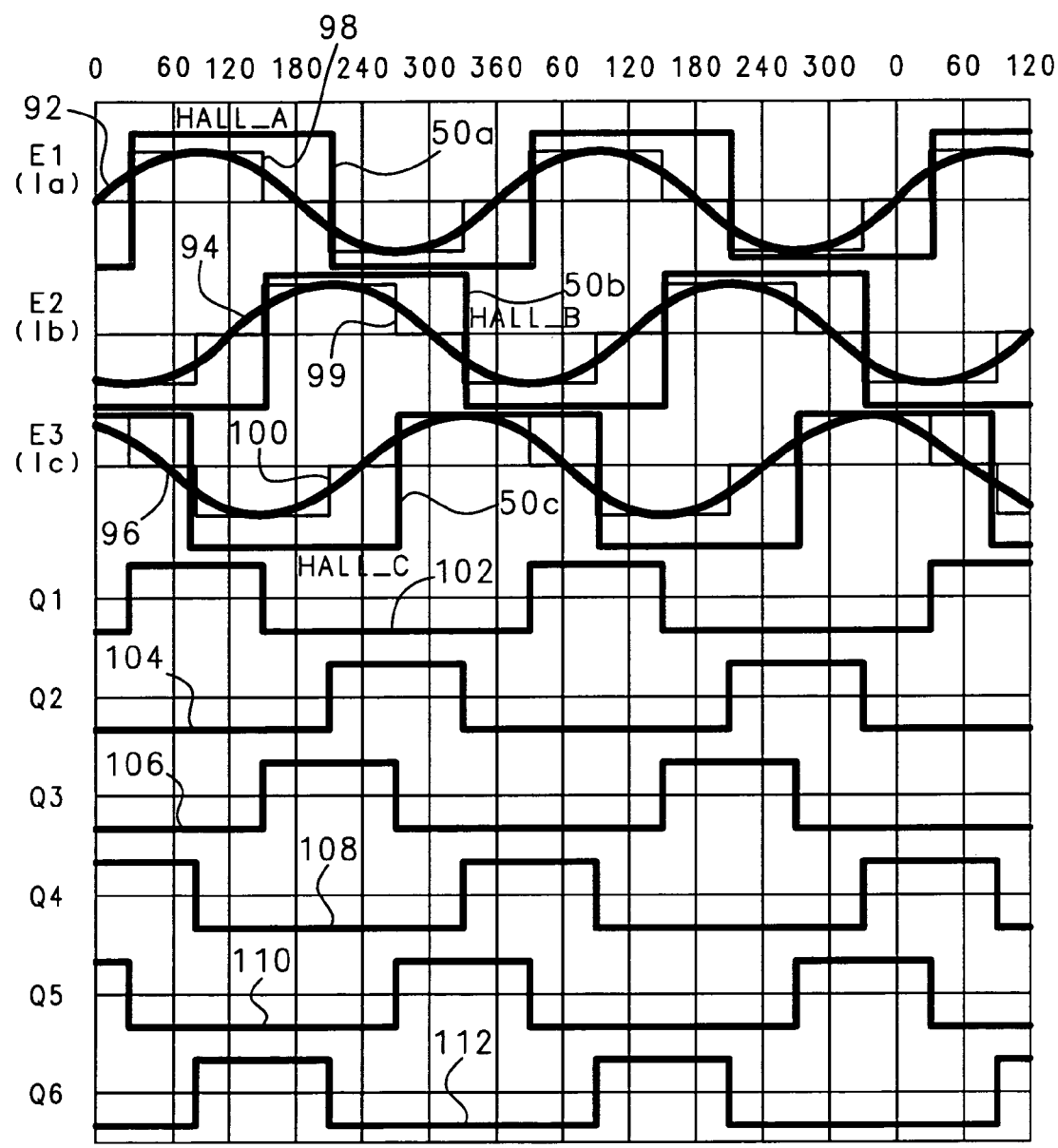
FIG. 5A is a timing diagram showing a plurality of signals associated with one mode of using a portion of the embodiment of FIG. 4 and a portion of the embodiment of FIG. 3.

FIG. 5A is a timing diagram showing various signals and one example way designed to an embodiment of this invention for developing the three bit word position feedback signal 52A. In FIG. 5A, the three phase position sensor square wave output signals 50A, 50B and 50C are shown associated with the back EMF wave forms 92, 94 and 96 from the corresponding phases of the motor 22. The rectangular current input to the motor 22 for each phase is shown corresponding to the associated sensor output and back EMF at 98, 99 and 100, respectively. As can be appreciated from FIG. 5A, there is a 120° phase shift between each of the phases shown at the top of FIG. 5A.

The three bit word provided to the commutation look-up table 59 is based upon the edges of the position sensor signals 50A, 50B and 50C. The conversion module 90 generates the three bit word 52A and the output of the look-up table 59 comprises the commutation signals 102, 104, 106, 108, 110 and 112. These correspond to the Q1-Q6 signals shown in FIGS. 2 and 3 during square wave commutation.

The signal at 102 includes pulses that have a rising edge corresponding to the rising edge of the sensor output signal 50A and a falling edge that corresponds to the rising edge of the sensor output signal 50B. The signal 104 has a rising edge associated with the falling edge of the sensor output signal 50A and a falling edge associated with the falling edge of the sensor output signal 50B. The signal 106 has pulses with a rising edge associated with the rising edge of the sensor output signal 50B and a falling edge associated with the rising edge of the sensor output signal 50C. The signal 108 has pulses associated with the falling edge of the signal 50B and the falling edge of the signal 50C. The signal 110 has pulses with a rising edge associated with the rising edge of the signal 50C and a falling edge associated with the rising edge of the signal 50A. Lastly, the signal 112 has pulses having a rising edge associated with the falling edge of the signal 50C and a falling edge associated with the falling edge of the signal 50A.

Commutation look up tables providing such an output can be developed using known techniques. Those skilled in the art who have the benefit of this description will be able to select from among such known techniques for providing square wave commutation signals like those schematically shown in FIG. 5A.

Once the motor 22 has reached a selected threshold speed (100 RPMs in one example), the controller 40 preferably switches from square wave commutation to sinusoidal commutation. At this point and for all motor speeds above the selected threshold, the commutation mode signal 54C preferably controls the switches within the torque control module 44 schematically shown in FIG. 3 so that the position feedback signal 52B is used for commutation rather than the square wave commutation associated with the position feedback signal 52A.

Referring again to FIG. 4, the position sensor processing module 42 includes a period measurement module 120 and a frequency determining module 122 that generates the speed feedback signal 52C. The output of the frequency determining module 122 is integrated by an integrator 124 to generate the position feedback signal 52B. In one example, the position feedback signal 52B is a sawtooth signal that is indicative of the electrical angle position of the motor.

Figure 5B:
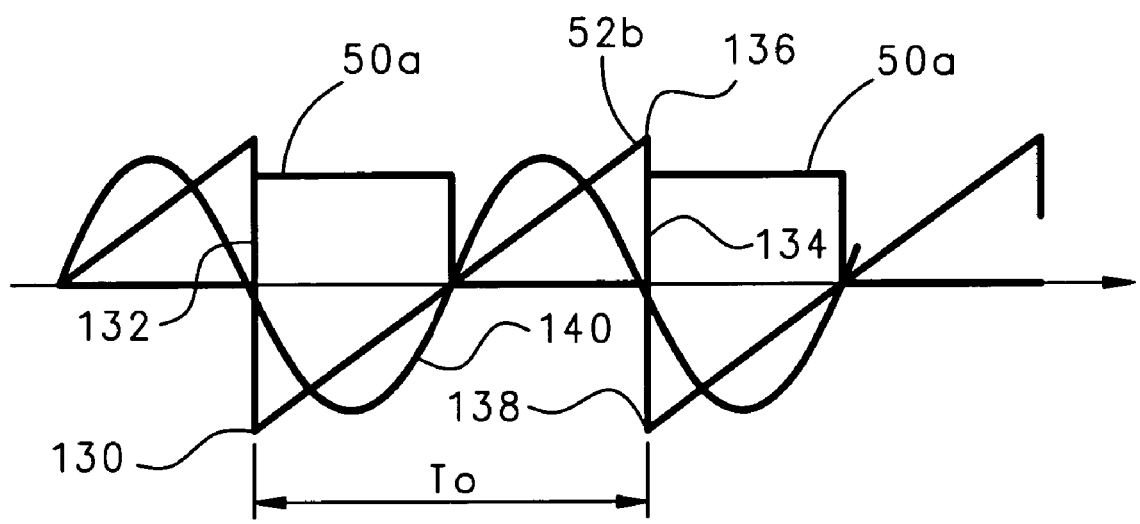
FIG. 5B is a timing diagram showing several signals associated with using another portion of the embodiment of FIG. 4 and a portion of the embodiment of FIG. 3.

Referring to FIG. 5B, a hall sensor output signal 50A is shown superimposed with a sawtooth signal that is the position feedback signal 52B. The electrical angle estimation begins at zero responsive to a leading edge pulse detector 126 that provides a reset signal 128 to the integrator 124. As can be appreciated from FIG. 5B at the leading edge of the sensor output signal 50A, the sawtooth signal 52B begins at zero at 130 when the leading edge 132 of the signal 50A occurs. Resetting the integrator 124 in this manner provides a unique way of selecting at least one phase of the sensor output as an initiator phase to reset the electrical angle position estimation. At the next leading edge 134 of the signal 50A the sawtooth signal 52B has reached a 360° maximum at 136 and is again reset to zero at 138 responsive to the reset signal 128 from the leading edge pulse detector 126.

By integrating the frequency of the square wave output signal 50A, the position sensor processor module 42 provides an estimation of the electrical angle of the motor through the position feedback signal 52B. That signal is then provided to the torque control module 44 as can be seen, for example, in FIG. 3. The sinusoidal current wave form 140 shown in FIG. 5B corresponds to the output 140 of the sin/cos look up table 64 in the embodiment of FIG. 3. That sinusoidal current wave form 140 is derived from the position feedback signal 52B and multiplied by the torque reference signal 54B from the speed control module 46.

Figure 6:
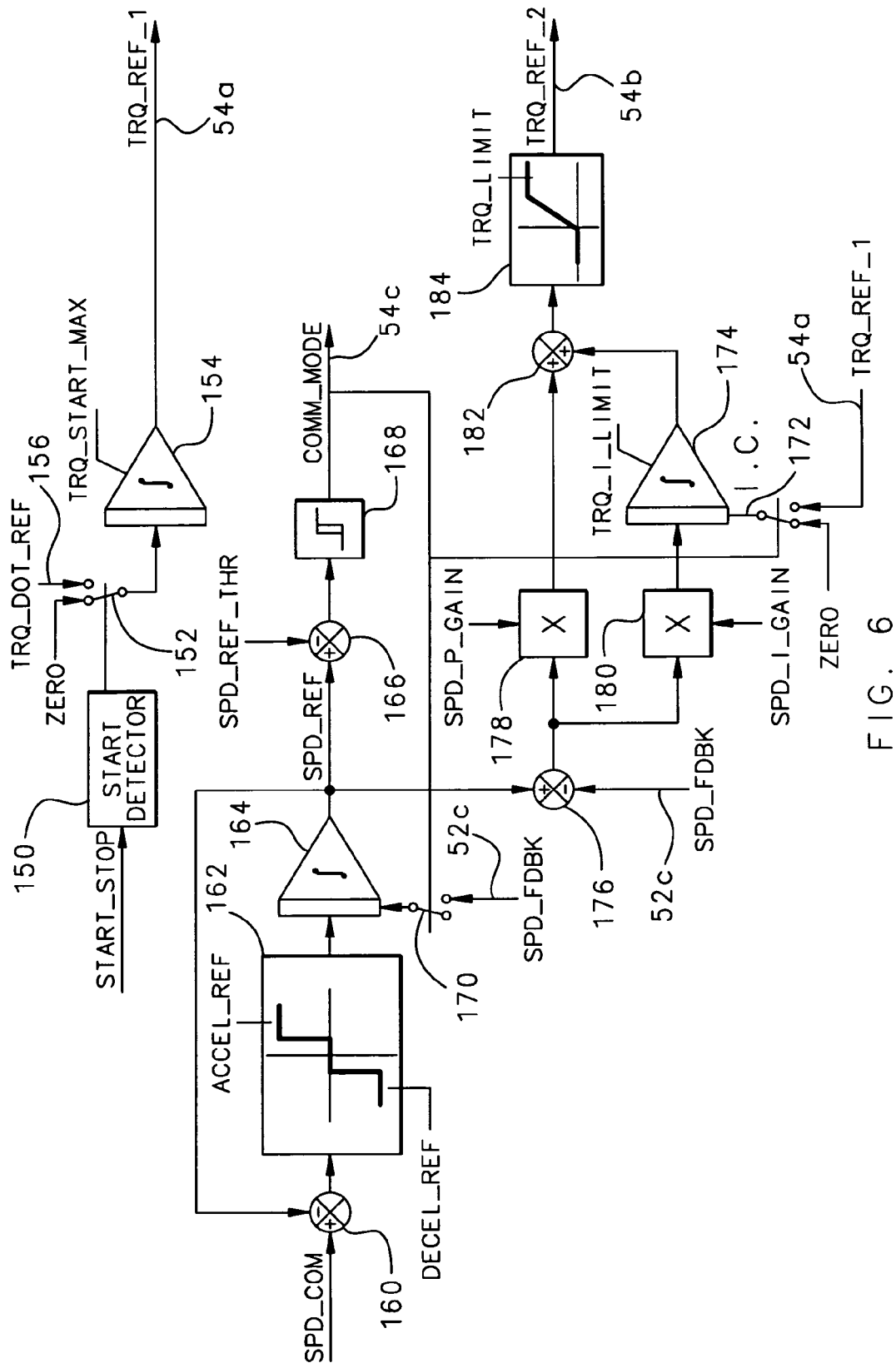
FIG. 6 schematically illustrates the speed control module of the embodiment of FIG. 2.

FIG. 6 schematically shows one example embodiment of the speed control module 46, which provides the torque reference signal 54B used for sinusoidal commutation. At initial motor start up, a start detector 150 receives a start-stop signal and operates a switch 152 so that an integrator 154 begins ramping up the torque reference signal 54A based upon the rate of ramp-up provided by the torque dot reference signal 156. The torque reference signal 54A is used by the torque control module 44 as shown in FIG. 3, for example. This is associated with square wave commutation at low motor speeds.

At the same time that the start-stop signal initiates the start detector 150, a speed command signal is provided to a summer 160 whose output is provided to a non-linear step command block 162. The output of the non-linear block 162 is provided to an integrator 164 that ramps up a speed reference output until it equals the speed command signal value. The speed reference output is provided to a summer 166 that also receives a speed reference threshold, which is the selected threshold motor speed at which the switch is made between square wave and sinusoidal commutation.

A zero crossing detector 168 receives the output of the summer 166 and provides the commutation mode signal 54C that provides the indication when to switch from square wave commutation to sinusoidal commutation.

The signal 54C operates the switch 170 associated with the integrator 164 so that the speed feedback signal 52C is provided to the integrator 164. At the same time, the signal 54C operates a switch 172 so that another integrator 174 is initiated with the torque reference signal 54A. The speed reference output from the integrator 164 is provided to a summer 176. The speed feedback signal 52C is combined with the speed reference signal in the summer 176. The output of the summer 176 is provided to multipliers 178 and 180 that receive proportional gain and integral gain inputs, respectively. The multiplied and integrated signals are then combined in a summer 182 and provided to the torque limiting function block 184 whose output is the torque reference signal 54B used by the torque control module 44 during sinusoidal (i.e., 180°) commutation.

In the above example, square wave (i.e., 120°) commutation is used at low motor speeds because the low resolution position sensors typically cannot provide accurate enough information to achieve good motor control. In another example, a technique for converting the square wave sensor output signals into sinusoidal commutation signals is used to provide the ability to use 180° commutation at all motor speeds. In this example, a first mode of converting the sensor signals into sinusoidal commutation signals is used at low motor speeds while the technique described above for generating the position feedback signal 52B provides sinusoidal commutation at motor speeds above a selected threshold (about 100 RPM in one example).

Figure 7:
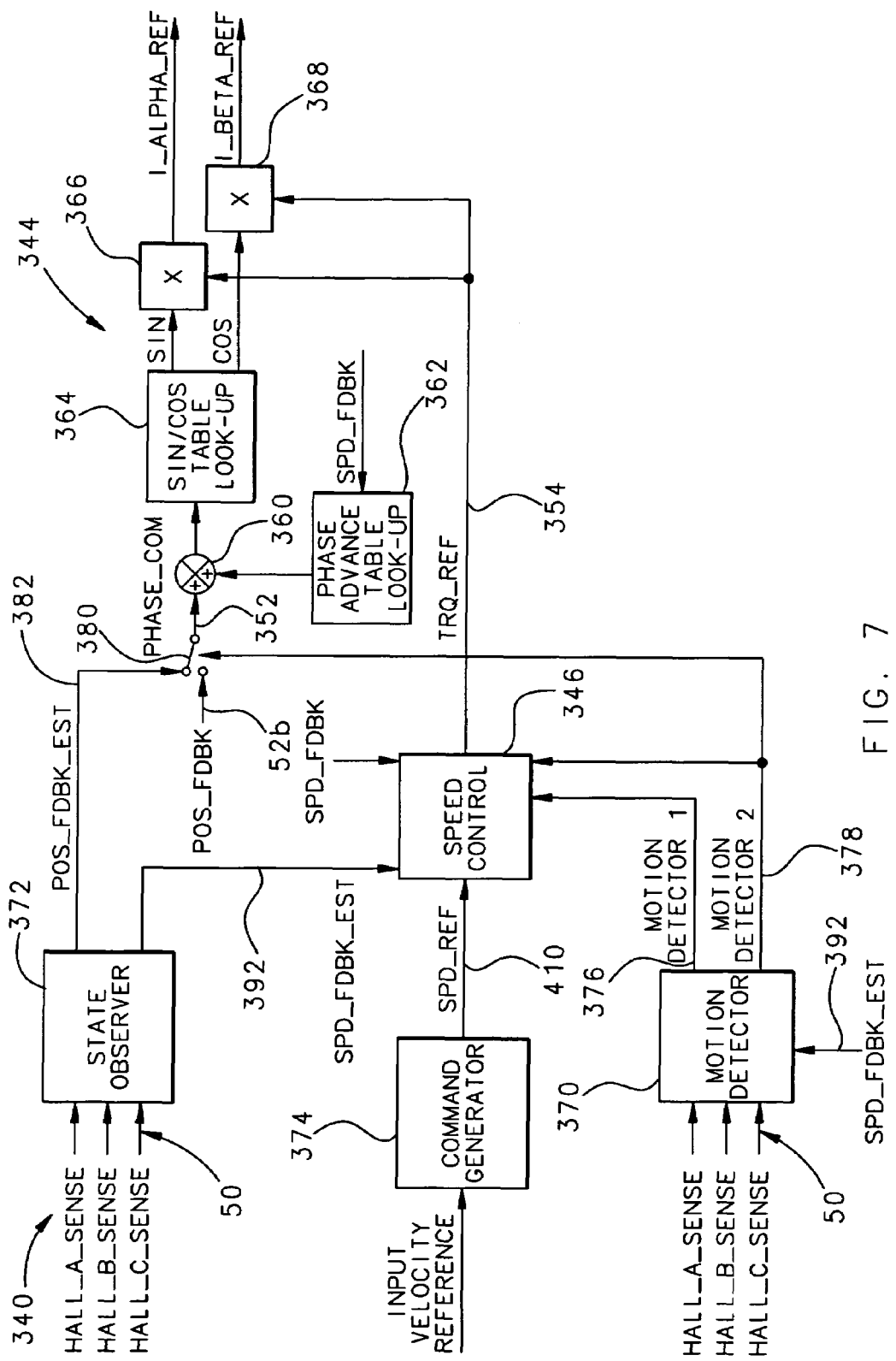
FIG. 7 schematically illustrates selected portions of another system controller designed according to an embodiment of this invention.

Referring to FIG. 7, selected portions of a modified controller 340 is schematically illustrated. Portions of a torque control module 344 are shown including a summer 360, a sin/cos look-up table 364, multipliers 366 and 368 and a phase advance look-up table 362. Each of these components correspond to similarly situated components in the embodiment of FIG. 3 (with a difference in the reference numbers of 300). A modified speed control module 346 is used in place of the speed control module 46 from the embodiment of FIGS. 2 and 6. Additionally, a motion detector 370, state observer 372 and command generator 374 are used in the embodiment of FIG. 7.

The motion detector 370 receives input from the low resolution position sensor 38, which comprises three square wave output signals 50 in this example. The example motion detector 370 comprises a counter that increments upon detecting at least one edge of each sensor output signal. In one example, the leading edge of each sensor output signal is used as the trigger for incrementing the counter of the motion detector.

The motion detector 370 provides two different output signals 376 and 378. The output signal 376 is a first motion detector signal that indicates some motion of the motor has been detected. The output signal 378 begins after a selected number of counts has been reached to indicate that reliable motion detection has begun. In one example, the output signal 376 corresponds to the first few sensor output pulse edges registered by the motion detector 370. The output signals 376 and 378 are provided to the speed control module 346.

The output signal 378 is also used to control a switch 380 that switches between the low speed sinusoidal commutation mode and the higher speed sinusoidal commutation mode. The switch 380 controls the input 352 to the summer 360 based upon the speed of the motor as provided by the output signal 378. In this example, the switch 380 switches between an output 382 from the state observer which provides a position feedback estimate and the position feedback signal 52B of the position sensor processing module from FIG. 4, for example. The output 382 from the state observer 372 is used at low speeds and provides the ability to use sinusoidal commutation even at very low speeds.

Figure 8:
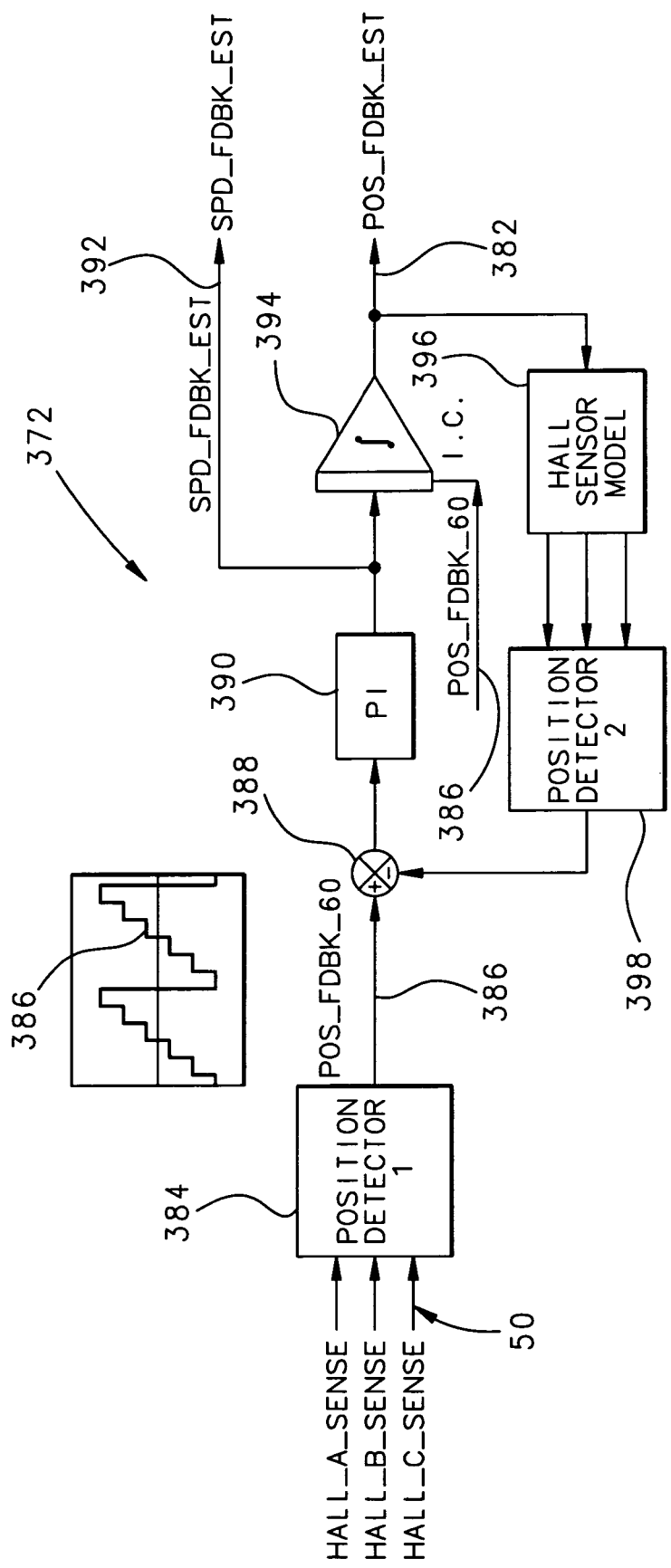
FIG. 8 schematically illustrates a state observer module of the embodiment of FIG. 7.

FIG. 8 schematically illustrates an example state observer 372. In this example, a position detector 384 that operates as a counter and increments 60° at each leading edge or falling edge of the position sensor signals. An output signal 386 from the position detector 384 in this example is a staircase function 386 that repeatedly increments between 0° and 360° responsive to the edge detection of the position detector 384. The output signal 386 is provided to a summer 388 and then a regulator 390. In one example, the regulator 390 is a proportional-integral regulator. In another example, a bang-bang control regulator is used. An output 392 of the regulator 390 provides a speed feedback estimate that is proportional to motor speed. This is provided to the speed control module 346 and the motion detector 370 as can be appreciated from FIG. 7.

An integrator 394, which is initialized during power-up by the staircase signal 386, converts the staircase signal 386 into a "smooth" sawtooth signal 382 that provides the position feedback estimate (i.e., motor electrical angle information) for sinusoidal commutation at low motor speeds. In this example, the integrator 394 is a modular $2\pi$ integrator so that a smooth ramped or sawtooth wave form results at 382.

In the example of FIG. 8, a feedback loop includes a position sensor model 396 that provides three outputs to another position detector 398 that generates another staircase function 400 that is provided to the summer 388. In this example, the staircase function 400 is subtracted from the staircase function 386 to provide an error signal as needed. In this example, the position sensor model 396 generates three pulse train signals shifted by 120 electrical degrees responsive to the sawtooth wave form from the integrator 394.

The embodiment of FIG. 8 has an input to the integrator 394 that contains only the staircase signal 386 from the first position detector 384 that can be used for motor commutation when additional phase shift in the estimated motor position is undesirable.

The state observer 372 derives rotor position information in a manner that can be used for sinusoidal commutation. In this example, the "smooth" sawtooth wave form signal 382 is used by the torque control module 44 in a similar manner that the sawtooth wave form signal 54B is used for sinusoidal commutation at higher speeds. The staircase signal of the state observer 372 provides the ability to derive rotor position information from a low resolution position sensor for generating sinusoidal commutation signals even at very low motor speeds.

Figure 9:
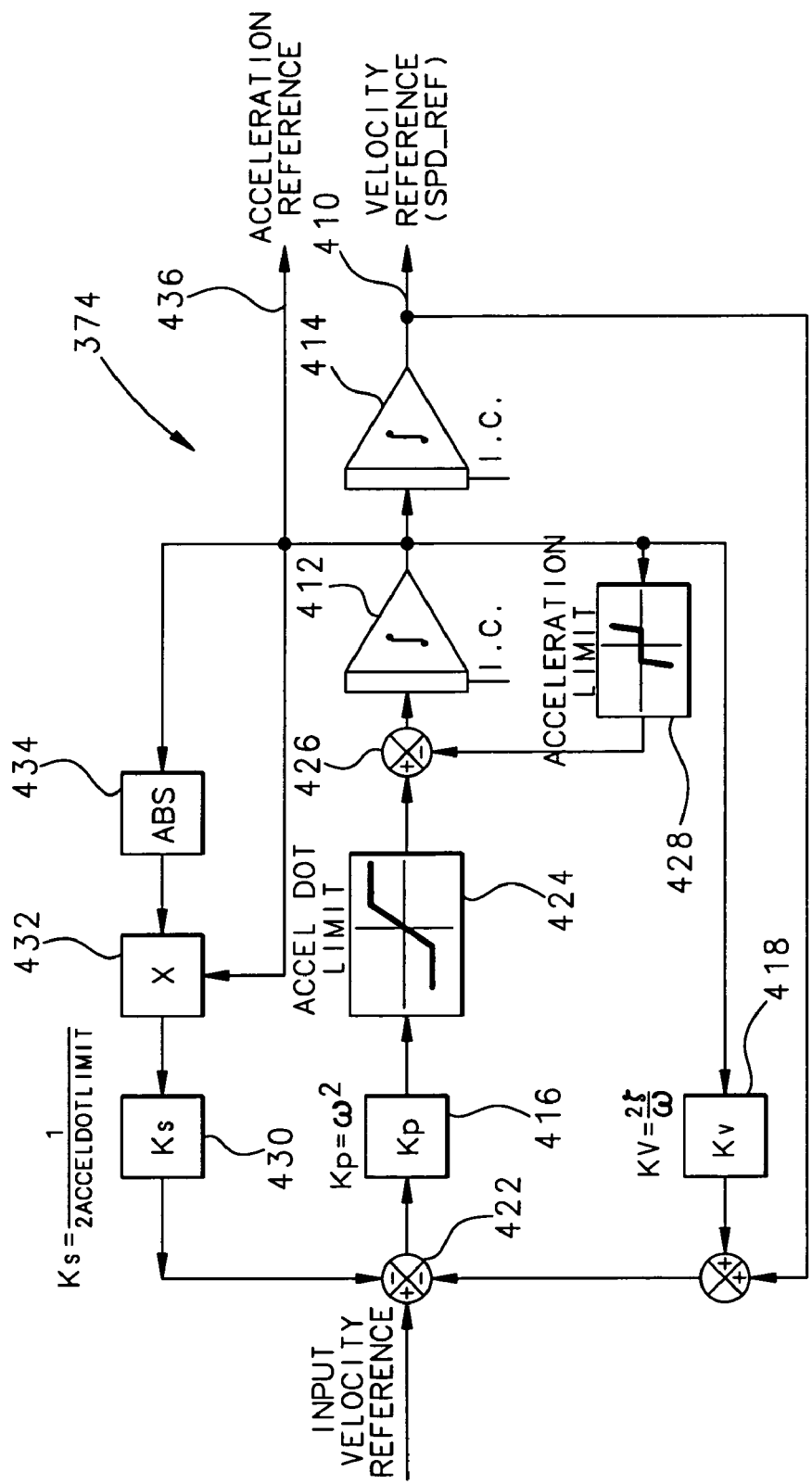
FIG. 9 schematically illustrates a command generator module of the embodiment of FIG. 7.

FIG. 9 schematically illustrates an example embodiment of the command generator 374 that provides a speed reference signal 410 to the speed control module 346. The command generator 374 in this example contains a second order dynamic block having two integrators 412 and 414. The purpose of the command generator is to let the acceleration of the motor 22 ramp up gradually to avoid disturbances in the motor operation. The command generator 374 calculates the speed reference signal 410 based on an acceleration limit and acceleration rate limit information.

The dynamic behavior of the command generator for small signal disturbances is specified by gains Kp 416 and Kv 418. The Kp gain 416 is selected based on a desirable frequency bandwidth of the command generator 374. The Kv gain 418 is selected based on a desirable frequency bandwidth and damping ratio. The damping is intended to avoid undesirable motor behavior responsive to a step change in velocity. The output of the Kv gain 418 is provided to a summer 420 that is then provided to a summer 422 which also receives an input velocity reference signal 423. The output of the summer 422 is provided to the Kp gain 416. The output of the Kp gain 416 is provided to a saturation function 424 with an output provided to a summer 426. The integrator 412 receives the output from the summer 426. A feedback loop of the integrator 412 includes a non-linear dead zone block 428 that provides an acceleration limit.

The output of the first integrator 412 is a signal 436 that provides an acceleration reference. That signal is provided along a non-linear feedback path to a gain block Ks 430. The non-linear feedback gain block 430 specifies the dynamic behavior of the command generator 374 responsive to larger signal disturbances. The input to the gain block 430 is from a multiplier 432 that has the signal 436 as one input and an output from an absolute value block 434 as another input. The gain block 430 provides a time optimal phase trajectory for a second order system with a limit function such as the saturation function block 424. The gain Ks is calculated based on a desirable limit of the acceleration rate.

Figure 10:
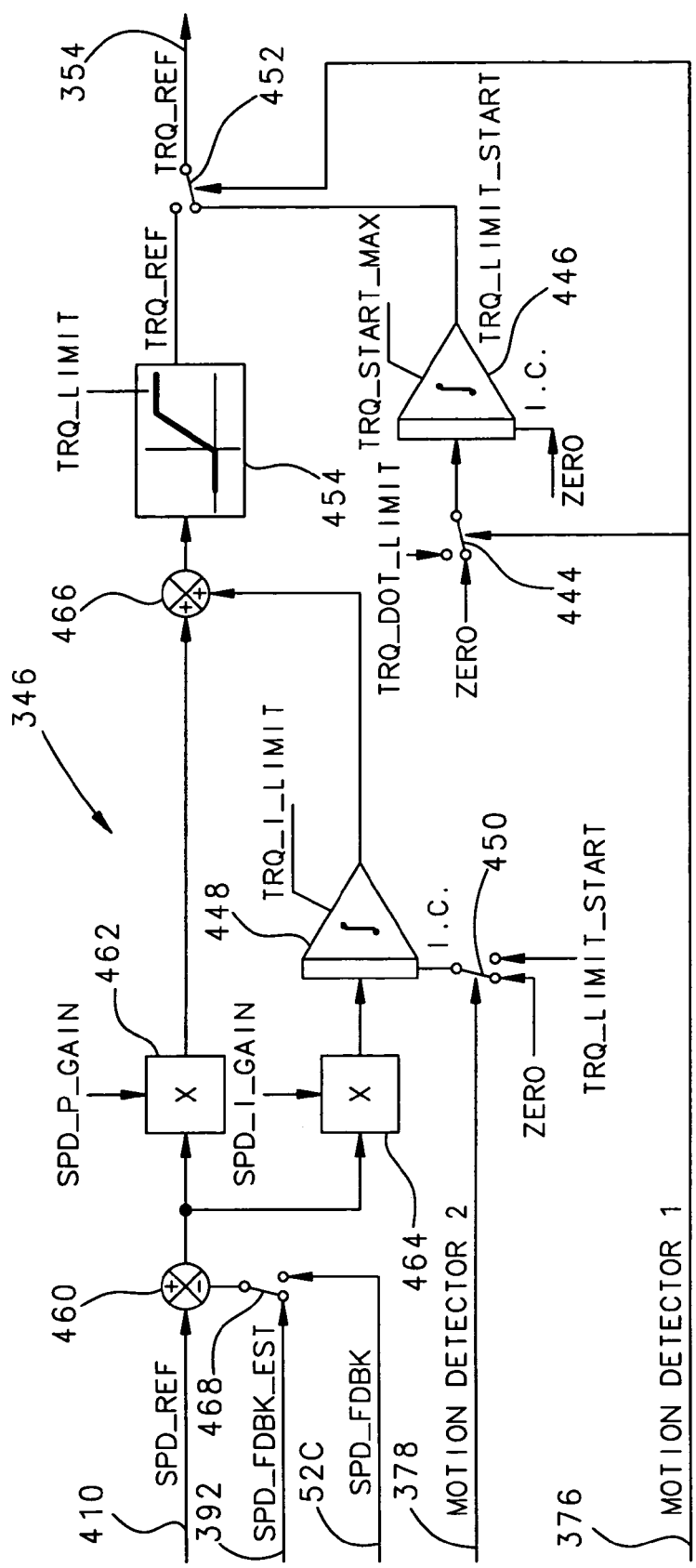
FIG. 10 schematically illustrates a speed controller module of the embodiment of FIG. 7.

The output signal 410 provides a speed reference that governs the speed of operation of the motor. The output signal 410 is provided to the speed control module 346 as can be appreciated from FIG. 10.

The speed controller module 346 in this example utilizes the speed feedback estimate signal 392 from the state observer 372 at low motor speeds. When the motion detector output signal 378 indicates a sufficiently high motor speed (i.e., 100 RPM), a switch 468 changes one of the inputs to a summer 460 from the speed feedback estimate signal 392 to the speed feedback signal 52C available from the embodiment of FIG. 4, for example.

At the beginning of motor movement, the motion detector output signal 376 switches a switch 444 so that an integrator 446 receives a torque dot limit input signal to begin ramping up the torque reference signal 354. After some amount of motion detection (100 counts within the motion detector in one example), the motion detector output signal 378 initializes an integrator 448 by operating the switch 450. At the same time, a switch 452 changes over from receiving output from the integrator 446 to receiving the torque reference signal 354 from the output of a saturation function block 454.

At low motor speeds, the speed feedback estimate signal 392 and the speed reference signal 410 from the command generator 374 are combined in a summer 460. The output of the summer 460 is multiplied in multipliers 462 and 464. The other input to the multiplier 462 is a proportional speed gain signal that is preset in one example. The multiplier 464 also receives an integral gain input signal. Another summer 466 combines the multiplied and integrated signals and the output from the saturation function block 454 provides the torque reference signal 354.

After the motor speed increases beyond a selected threshold, the motion detector signal 378 operates another switch 468 so that the input to the summer 460 switches from the speed feedback estimate signal 392 from the state observer 372 to the speed feedback signal 52C from the position sensor processing module 42 of FIGS. 2 and 4, for example.

One difference between the speed controller module 346 of this figure and that shown in FIG. 6 is that closed loop control is used for switching between the initial torque ramp up, the use of the speed feedback estimate signals 392 at low motor speeds and the speed feedback signal 52C at higher motor speeds. In the example of FIG. 6, open loop switching control is used.

As can be appreciated from FIGS. 7-10, this embodiment utilizes 180° commutation throughout the entire motor control beginning at very low speeds, even though low resolution position sensors providing square wave outputs are utilized to provide rotor position information. This embodiment improves soft starting capabilities and reduces the switching modes to simplify control and tuning compared to the embodiment of FIGS. 4 and 6, for example, where the controller uses 120° (i.e., square wave) commutation at low motor speeds and then switches to sinusoidal (180° commutation) after a selected threshold is reached.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of controlling an electric motor using a low resolution position sensor, comprising:
converting a square wave output signal from a low resolution position sensor into a sinusoidal motor commutation signal by generating a torque reference signal based on the square wave output signal and generating the sinusoidal motor commutation signal by multiplying the torque reference signal by a sinusoidal signal.

2. The method of claim 1, including estimating an electrical position of the motor based upon an edge of the square wave output signal.

3. The method of claim 2, including selecting at least one sensor phase as an initialization phase and resetting the estimated motor position to 0 degrees at each occurrence of a selected edge of the square wave output of the initialization phase.

4. The method of claim 2, including determining a frequency of the square wave output signal and integrating the determined frequency to thereby generate a sawtooth signal that is indicative of the electrical position.

5. The method of claim 4, including
determining a sin component and a cos component of the sawtooth signal;
multiplying the sin and cos components, respectively, by a torque reference signal; and
converting the multiplied sin and cos components into signals that are used to control power to the motor.

6. The method of claim 2, including selectively adding a phase advance to the estimated electrical position responsive to a speed of the motor.

7. The method of claim 2, including generating a staircase signal having step increments that correspond to edges of the square wave output signal, the staircase signal repeatedly beginning at 0 degrees and incrementing to 360 degrees.

8. The method of claim 7, including integrating the staircase signal to generate a sawtooth signal that is indicative of the electrical position.

9. The method of claim 1, including using the square wave output for commutation at low motor speeds and switching to using the sinusoidal motor commutation signal at motor speeds above a selected threshold.

10. The method of claim 9, including maintaining the motor speed above the threshold after switching to the sinusoidal motor commutation signal.

11. The method of claim 9, including providing a plurality of sensors that equals a number of phases in the motor and using 120 degree commutation when using the square wave output for commutation at low motor speeds and using 180 degree commutation when using the sinusoidal signal.

12. A motor controller, comprising:
a low resolution position sensor; and
a processor that processes a square wave output signal from the low resolution position sensor to generate a commutation signal, the processor converting the square wave output signal into a sinusoidal commutation signal by generating a torque reference signal based on the square wave output signal and generating the sinusoidal motor commutation signal by multiplying the torque reference signal by a sinusoidal signal.

13. The motor controller of claim 12, wherein the processor generates a square wave commutation signal at low motor speeds and generates the sinusoidal commutation signal at motor speeds above a selected threshold.

14. The motor controller of claim 12, wherein the motor has a plurality of phases and the sensor output has a plurality of phases that equals the number of motor phases and wherein the processor uses edges of the sensor square wave output signal to estimate an electrical position of the motor.

15. The motor controller of claim 14, wherein at least one sensor output phase is an initialization phase and the processor resets the estimated motor position to 0 degrees at each occurrence of a selected edge of the initialization phase.

16. The motor controller of claim 12, wherein the processor determines a frequency of the square wave output signals and integrates the determined frequency to thereby generate a sawtooth signal that is indicative of the electrical position.

17. The motor controller of claim 12, including a phase advance module that selectively adds a phase advance to the sinusoidal commutation signal responsive to the motor exceeding a selected speed.

18. The motor controller of claim 12, including a position detector that generates a staircase signal having step increments that correspond to edges of the square wave output signal.

19. The motor controller of claim 18, including an integrator that integrates the staircase signal to generate a sawtooth signal that is indicative of an electrical position of the motor and the controller uses the sawtooth signal to generate the sinusoidal commutation signal.

20. The motor controller of claim 12, including a plurality of sensors that equals a number of phases in the motor and wherein the controller uses 120° commutation when using the square wave output for commutation at low motor speeds and uses 180° commutation when using the sinusoidal signal.

21. The method of claim 1, comprising
obtaining position information from the square wave output signal;
providing speed feedback information based upon the position information; and
generating the torque reference signal based on the speed feed back information.

22. The method of claim 1, comprising
multiplying the torque reference signal by a sin output and a cos signal, wherein the sinusoidal commutation signal results from the multiplying.

23. The method of claim 22, comprising
selecting the sin output and the cos signal based on at least one of the position information or speed feedback.

24. A method of controlling an electric motor using a low resolution position sensor, comprising:
using a square wave output signal from the low resolution position sensor for commutation at low motor speeds;
switching to using sinusoidal motor commutation at motor speeds above a selected threshold, the sinusoidal motor commutation being based upon a sinusoidal motor commutation signal that is obtained by converting the square wave output signal from the low resolution position sensor into the sinusoidal motor commutation signal; and
providing a plurality of sensors that equals a number of phases in the motor and using 120° commutation when using the square wave output for commutation at the low motor speeds and using 180° commutation when using the sinusoidal motor commutation signal.

25. A motor controller, comprising:
a low resolution position sensor;
a processor that processes a square wave output signal from the low resolution position sensor to generate a commutation signal, the processor converting the square wave output signal into a sinusoidal commutation signal;
a position detector that generates a staircase signal having step increments that correspond to edges of the square wave output signal; and
an integrator that integrates the staircase signal to generate a saw tooth signal that is indicative of an electrical position of the motor and the controller uses the saw tooth signal to generate the sinusoidal commutation signal.

26. A motor controller, comprising:
a plurality of sensors that equals a number of phases in a motor; and
a processor that processes a square wave output signal from the sensors and wherein the controller uses 120° commutation and the square wave output for commutation at low motor speeds, the controller using 180° commutation and a sinusoidal commutation signal at motor speeds above a selected threshold, the processor converting the square wave output signal into the sinusoidal commutation signal.

* * * * *